United States Patent [19]

Mercer

[11] Patent Number: 5,031,877

[45] Date of Patent: Jul. 16, 1991

[54] FABRICATED HOUSING ASSEMBLY FOR A FAUCET VALVE

[75] Inventor: Lee A. Mercer, Valley City, Ohio

[73] Assignee: Moen Incorporated, Elyria, Ohio

[21] Appl. No.: 585,659

[22] Filed: Sep. 20, 1990

[51] Int. Cl.⁵ .............................................. F16L 5/00
[52] U.S. Cl. .................................... 251/367; 137/359; 137/360
[58] Field of Search ...................... 251/310, 366, 367; 137/359, 360, 454.6, 801

[56] References Cited

U.S. PATENT DOCUMENTS

| | | |
|---|---|---|
| 2,631,002 | 3/1953 | Mueller .............................. 251/310 |
| 3,278,156 | 10/1966 | Callahan, Jr. et al. ............. 251/367 |
| 4,597,559 | 7/1986 | Kirk .................................... 251/367 |
| 4,662,389 | 5/1987 | Igbal .................................. 137/360 |

Primary Examiner—A. Michael Chambers
Attorney, Agent, or Firm—Kinzer, Plyer, Dorn, McEachran & Jambor

[57] ABSTRACT

A fabricated housing assembly for a faucet valve is made from multiple economically manufactured components which can be permanently attached by soldering or by an adhesively secured threaded connection.

10 Claims, 1 Drawing Sheet

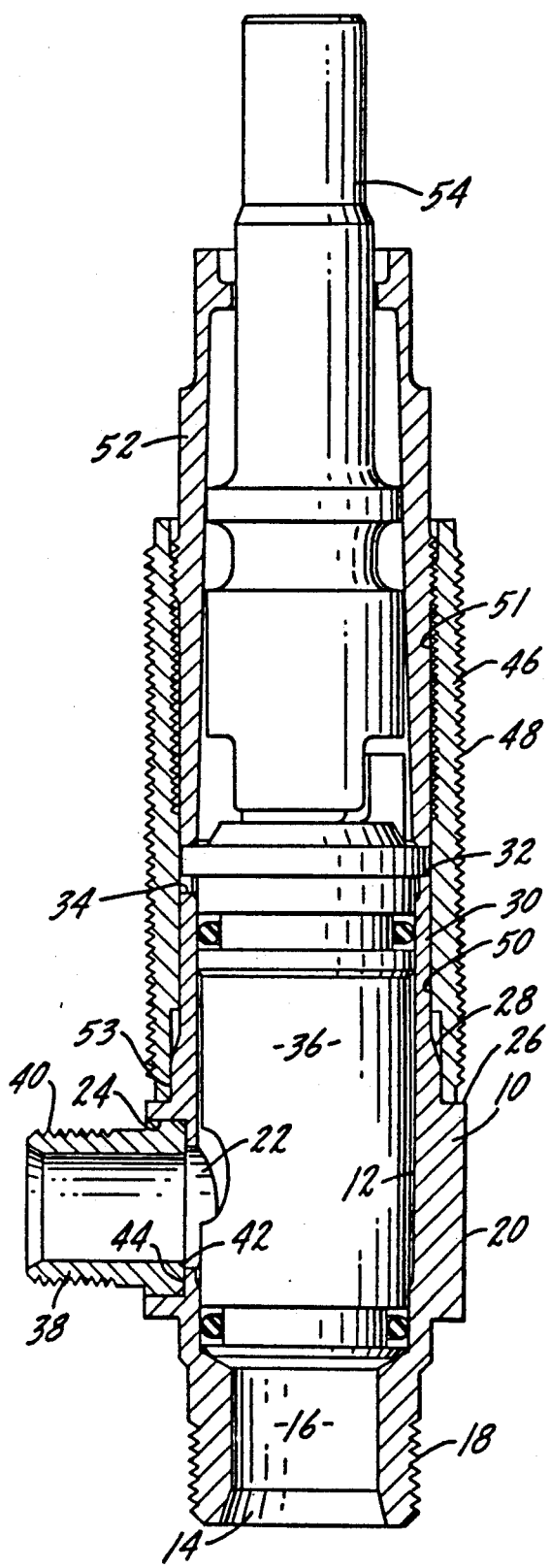
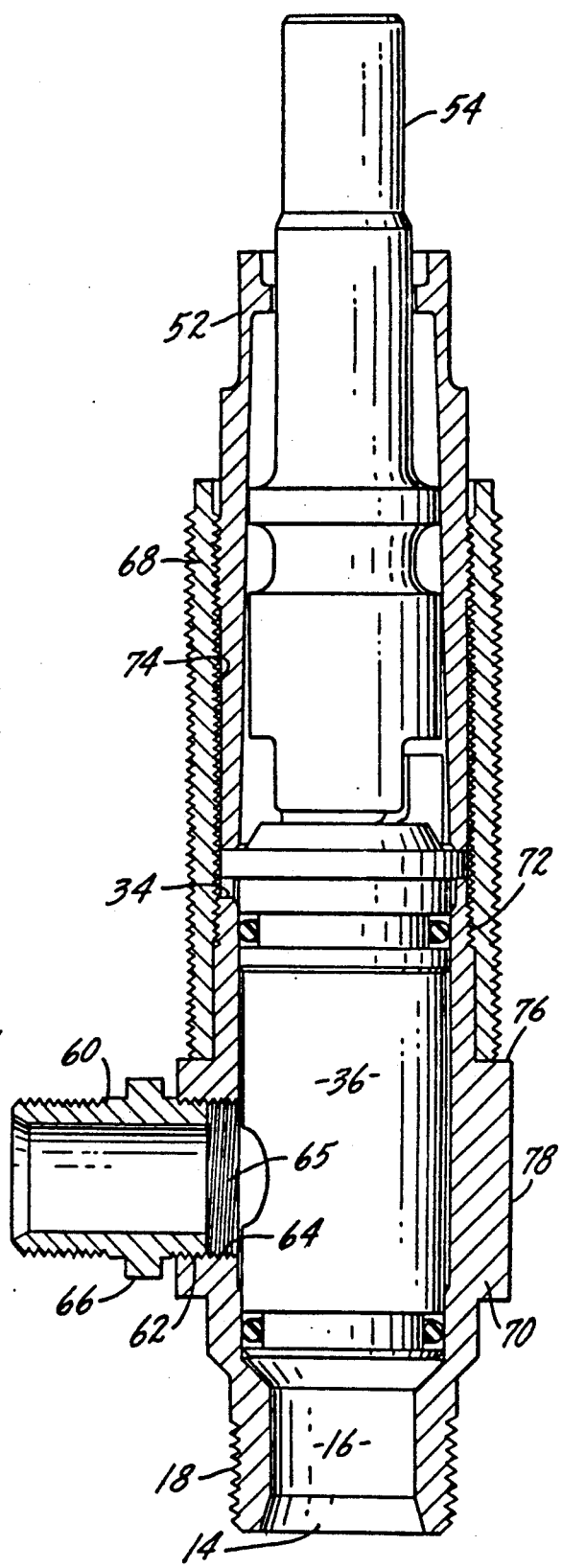

FABRICATED HOUSING ASSEMBLY FOR A FAUCET VALVE

SUMMARY OF THE INVENTION

The present invention relates to the construction of a fabricated housing assembly for a faucet valve.

One purpose of the invention is to provide a faucet housing assembly which is economical to manufacture.

Another purpose of the invention is to provide a housing for a faucet valve which can be quickly and inexpensively manufactured.

Another purpose is to provide a housing for a faucet valve which can be assembled from multiple economically manufactured components.

Other purposes will appear in the ensuing specification, drawings and claims.

BRIEF DESCRIPTION OF THE DRAWINGS

The invention is illustrated diagrammatically in the following drawings wherein:

FIG. 1 is a longitudinal sectional view of one embodiment of the valve housing assembly disclosed herein, and FIG. 2 is a longitudinal sectional view of a second embodiment.

DESCRIPTION OF THE PREFERRED EMBODIMENT

At present, housings for faucet valves are made from brass forgings. The housing has a threaded connection for a water supply conduit; a cavity for a faucet valve, or a valve cartridge, as it is commonly described; a threaded connection for an outlet conduit; and a threaded connection for mounting the housing to a faucet deck. The forged housing requires substantial machine operations before it is complete. Further, the tools for such forged products are limited to approximately 50,000-75,000 pieces before replacement is required.

The present invention is directed to providing a faucet valve housing which is functionally identical to a forged housing, but which is substantially less expensive to manufacture. The faucet valve housing assembly is made from individual components, each of which can be made from bar stock on high speed machines such as automatic screw machines. The individual components can then be assembled into a housing and these components secured together either by multiple soldering operations, as is conventional in high speed production lines, or by using a sealing type of adhesive on threads which join the multiple components into a single unit.

The housing assembly of FIG. 1 is formed of multiple machined parts which are soldered together in final assembly. In FIG. 2, the fabricated housing assembly is formed from multiple machined parts which are connected together by threads, with a suitable adhesive being used on the threads to both secure the parts into a single unit and seal the connections between parts.

In FIG. 1, there is a body 10 which may be formed from brass bar stock on a high speed screw machine. The body has a central cavity 12 within which is positioned a valve cartridge of the type sold by Moen Incorporated, the assignee of the present application, under the trademark "1224". This is not a mixing valve, but is a control valve for either the hot or cold water side of the faucet. At the lower end of body 10 there is an inlet 14 which is connected by a passage 16 to cavity 12. The exterior of body 10 adjacent the inlet is threaded, as at 18, for use in connecting a water conduit to the inlet opening of the body. The middle section of body 10 may have a plurality of flatted surfaces, one of which is indicated at 20. This may be considered a tool engaging surface for mounting the faucet assembly and the flats may, in combination, provide a surface which is hexagonal or any other polygonal shape.

Body 10 has an outlet opening 22 which is in communication with cavity 12 and there is a generally cylindrical boss 24 which terminates at one of the flatted surfaces 20. The upper edge of the combined flatted surfaces 20 is in the form of a peripheral or circumferential shoulder 26 which may be considered a support surface as will be described in more detail hereinafter. Body 12, above the support surface, has a tapered area 28 and then an axially extending portion 30 which terminates in an upper edge 32. The portion 30 of body 10 directly adjacent surface 32 has a small notch 34 which will receive a locating key extending outwardly from the upper end of valve cartridge 36. The valve cartridge will be correctly located within body 10 by the notch and key described.

Positioned within outlet bore 24 is a hose nipple 38 which has an exterior thread 40 for use in attaching an outlet conduit. Hose nipple 38 has a flat surface 42 at the interior end which is positioned against a shoulder 44 formed at the interior end of bore 24 and directly adjacent outlet 22. End surface 42 and shoulder 44 together combine to properly locate hose nipple 38 in the housing assembly.

A valve extender in the form of a cylindrical sleeve is indicated at 46 and has an exterior threaded surface 48 for use in mounting the fabricated housing assembly to a faucet deck. The interior of valve extender 46 has a portion 50 which is of a diameter to closely fit about the axially extending portion 30 of body 10. There is an interior threaded section 51 on valve extender 46 which threadedly mounts a cartridge nut 52 inside of which is positioned a stem extension 54 which is in engagement with the stem of valve cartridge 36. Rotation of stem extension 54 will cause rotation of the valve member within cartridge 36 to control the supply of water through the valve cartridge.

In the embodiment of FIG. 1, assembly of the fabricated housing includes the positioning of spout nipple 38 within bore 24 and the positioning of valve extender 46 about the outside of the upper end of the valve body such that the lower surface of the valve extender is firmly against shoulder 26 of body 10. Once these elements are in position, a solder joint is made between the hose nipple and the area of the body about bore 24. A similar solder connection is made between body 10 and the interior surface of the valve extender, as at 53. This completes assembly of the fabricated housing.

In the FIG. 2 embodiment, there are two principal differences from what was disclosed in FIG. 1. The hose nipple, designated at 60, has an exterior threaded surface 62 which cooperates with a thread 64 on bore 65. The location of bore 65 and the body outlet is the same as in FIG. 1. Hose nipple 60 has a tool engaging area indicated at 66 which will facilitate the threaded mounting of the hose nipple within the bore. This threaded assembly should include the application of a sealing adhesive on one or both of the threads on the bore and on the hose nipple. The adhesive will not only seal the space between the hose nipple and the bore, but will permanently attach the hose nipple to the body.

The other difference resides in the use of a threaded connection between valve extender 68 and body 70. The upper end of body 70 has a threaded area 72 which cooperates with an internal thread 74 on the valve extender. The valve extender is threaded onto the body until the valve extender is firmly against support surface 76 formed by the tool engaging surface 78. When the valve extender and the body are so positioned, and assuming that a sealing adhesive has been placed on one or both of the threads of these two parts, the fabricated housing assembly is complete.

The present invention is specifically directed to a simplified and less expensive faucet housing. At present, it is common practice in the plumbing industry to use a forged faucet housing. After the forging is complete, there is substantial machining of the part before it is ready for use. The present invention not only avoids forging, but also the expensive machining operations which take place after the forging process. By using multiple parts, each of which can be formed from bar stock and on high speed screw machines, it is possible to fabricate a faucet housing at much less cost than by the forging process. Also, from a supply of parts made in this manner, it is possible to construct faucet housing of different configuration providing the manufacturer with far more flexibility in terms of housing shape, size and use than was heretofore possible with an expensive forging process.

Whereas the preferred form of the invention has been shown and described herein, it should be realized that there may be many modifications, substitutions and alterations thereto.

The embodiments of the invention in which an exclusive property or privilege is claimed are defined as follows:

1. A fabricated housing assembly for a faucet valve, said assembly including a body having a central cavity of a size and shape to hold a faucet valve, said body having an inlet, with the exterior of said body adjacent said inlet being threaded to attach a water conduit thereto, said body having an opening connected to said central cavity, a hose nipple positioned in said opening and having an exterior thread thereon for use in attaching a water conduit thereto, said hose nipple and body opening having cooperating means thereon for permanently attaching the hose nipple to said body, an external support surface on said body, and a valve extender mounted on the exterior of said body and positioned relative thereto by said external support surface, said valve extender having a threaded exterior thereon for use in mounting the fabricated housing assembly to a faucet deck.

2. The fabricated housing assembly of claim 1 further characterized in that the cooperating means on said hose nipple and body opening include cooperating threads, said cooperating threads having an adhesive thereon to permanently attach the hose nipple to the body opening and to provide a watertight seal therebetween.

3. The fabricated housing assembly of claim 2 further characterized in that said body and said valve extender have cooperating threaded areas thereon, an adhesive on said threaded areas to permanently attach the valve extender to the body and to form a seal therebetween.

4. The fabricated housing assembly of claim 1 further characterized in that said body external support surface is adjacent said body opening.

5. The fabricated housing assembly of claim 4 further characterized in that said body has an external tool engaging surface thereon, one end of which forms said body support surface.

6. The fabricated housing assembly of claim 5 further characterized in that said body opening is formed in said tool engaging surface.

7. The fabricated housing assembly of claim 1 further characterized in that the cooperating means on said hose nipple and body opening for permanently attaching the hose nipple to said body includes a circumferential ledge adjacent said body opening, said hose nipple having an end surface positioned against said ledge, and a solder connection for permanently and sealingly attaching the hose nipple to said body.

8. The fabricated housing assembly of claim 7 further characterized in that the interior of said valve extender and the exterior of said body have mating circumferentially contacting surfaces, and a solder connection therebetween.

9. The fabricated housing assembly of claim 1 further characterized in that the internal surface of said valve extender has a circumferential threaded surface thereon for use in mounting a faucet part therein.

10. The fabricated housing assembly of claim 1 is further characterized in that the external support surface is configured with a keyway to provide accurate alignment of a faucet part in said central cavity.

* * * * *